Patented June 22, 1954

2,681,899

UNITED STATES PATENT OFFICE 2,681,899

STABILIZED ISOOLEFIN POLYOLEFIN INTERPOLYMER DERIVATIVES AND METHOD OF PRODUCING SAME

Richard A. Crawford, Akron, and Richard T. Morrissey, Cuyahoga Falls, Ohio, assignors to The B. F. Goodrich Company, New York, N. Y., a corporation of New York No Drawing. Application September 5, 1952, Serial No. 308,167

5 Claims. (Cl. 260—45.7)

1

The present invention relates to the stabilization of isoolefin polyolefin interpolymer derivatives and, in particular, to compositions comprising a rubbery brominated or bromine-containing interpolymer of an isoolefin hydrocarbon and a polyolefin hydrocarbon, together with a metal silicate stabilizer therefor, and to methods of producing such compositions.

Among the known synthetic rubbers are the solid plastic interpolymers of a major proportion of an isoolefin such as isobutylene and a minor proportion of one or more polyolefins (that is, diolefins, triolefins or other olefins containing more than one double bond), which interpolymers are characterized by high molecular weight, low unsaturation and reactivity (vulcanization or curing) with sulfur to yield an elastic product. Such interpolymers are described in U. S. patents including Nos. 2,322,073; 2,356,128; 2,356,129; 2,356,130; 2,373,706; 2,384,975; 2,418,912 and 2,568,656 and in copending application Serial No. 166,979 filed June 6, 1950. The presently best known examples of such interpolymers are the copolymers of isobutylene with a small proportion of isoprene or butadiene known to the rubber industry as Butyl (or GR–I) rubber.

While Butyl rubber has found considerable use in the manufacture of inner tubes, it possesses inherent disadvantages which have prevented its more widespread use. It vulcanizes or cures more slowly than other widely used sulfur-vulcanizable rubbery materials; it does not adhere well to other materials including natural rubber, and when it is mixed with natural rubber and the mixture vulcanized the resulting vulcanizates are generally less valuable than vulcanizates from either of the rubbery materials alone.

It is disclosed in our copending application Serial No. 156,724 filed April 18, 1950, of which this application is a continuation-in-part, that the introduction of bromine atoms into the polymer structure of "Butyl" rubber and similar isoolefin-polyolefin interpolymers, so as to produce units of the structure

as by bromination of such interpolymers, results in the obtainment of new materials with properties unexpectedly superior to those of the bromine-free materials. Such brominated rubbery isoolefin-polyolefin interpolymers cure or vulcanize quite rapidly, even with vulcanizing agents which are totally ineffective with the unbrominated materials, to yield vulcanized products

2 which far surpass those obtained from the unbrominated materials in a number of respects including a much greater ability to withstand the effects of heat and aging, and a lower permanent set, and which are fully equal or superior to the vulcanizates from unbrominated materials in other respects such as tensile strength and elasticity, low temperature flexibility and resistance to air-diffusion. In addition, the brominated interpolymers, unlike the unbrominated materials, adhere well to a wide variety of materials including metals, plastics, and natural and synthetic rubbers and are, therefore, of considerable value as adhesives; they may also be mixed with natural rubber or any of the various known butadiene synthetic rubbers in any desired proportions and the resulting mixtures co-vulcanized to give products of excellent properties.

It has been found, however, that the rubbery brominated isoolefin polyolefin interpolymers are per se somewhat unstable as evidenced by their development of color upon heat aging or upon long standing at room temperature and by their becoming progressively tougher during storage or heat aging or during the Mooney viscosity determination. Their lack of stability also sometimes results in progressive degradation of their vulcanizates, during extended exposure to heat, in such physical and chemical properties as tensile strength, elongation, modulus, flex-life, ozone resistance, and adhesiveness.

The invention of this application resides in the discovery that such brominated isoolefin polyolefin interpolymers may be efficiently stabilized against such undesirable changes by incorporating therein a small amount of a metal silicate of a class to be hereinafter defined. The resulting stabilized composition is possessed of the properties of the original brominated interpolymer and in addition is sufficiently stable to withstand prolonged storage and exposure to heat and light and other deleterious influences. Vulcanizates prepared from the silicate-containing compositions are likewise of superior stability to heat and possess improved physical properties especially at hot temperatures.

The metal silicate stabilizers of this invention are the silicates of metals occurring in group II of the periodic table. Calcium silicate is greatly preferred although other alkaline earth metal silicates such as barium and strontium silicate, as well as the silicates of magnesium, zinc, cadmium and other group II metals may also be used.

The silicate stabilizers used in this invention may be naturally-occurring or they may be synthetically prepared by precipitation or fusion. It is preferred to precipitate the silicate in as finely-divided a state as is possible and to grind the fused silicate to a fine state of sub-division before use. The particle size should be preferably that of the commonly used pigments, fillers, stabilizers, etc. in common use in the rubber industry.

The silicate stabilizer may be incorporated into the brominated interpolymer at any time before vulcanization although it is preferred to incorporate the stabilizer as an integral step in manufacture of the brominated interpolymer. If incorporated into the solid brominated interpolymer, this may be done satisfactorily on a two-roll rubber mill or in a Banbury-type or other internal mixer or by dissolving or dispersing the brominated interpolymer in an appropriate medium and adding a silicate dispersion or suspension thereto. The preferred method is to blend a stabilizer dispersion or suspension with a solution containing the brominated interpolymer as obtained from the bromination process and effect coprecipitation of the brominated interpolymer and the silicate stabilizer in the form of discrete particles in which the latter is uniformly dispersed in the former. The exact manner in which the preferred incorporation step is carried out will be more fully described in the description below.

The amount of the silicate stabilizer required for efficient stabilization will vary somewhat depending on the interpolymer treated and on its bromine-content, on the silicate utilized and on its fineness and compatibility with the rubber. In general, significant stabilization is noted, especially with calcium silicate, in amounts as little as 1% by weight based on the rubbery interpolymer. The beneficial effect increases with increasing amounts of silicate stabilizer up to about 5 to 10%. Beyond 10% the additional silicate seems to function only as a filler, although beneficial in most cases. For stabilization only, however, amounts of 1 or 2 to 5% are preferred. For combined stabilizer and filler action (as in white sidewall tire compounds utilizing calcium silicate) amounts up to 15 to 20 volumes or more of silicate per 100 volumes of bromine-containing interpolymer or from 1 to 100% by weight or more may be utilized.

The brominated isoolefin-polyolefin interpolymers in which the stabilizer is incorporated are prepared, according to the preferred procedure of our copending application Serial No. 156,724, now U. S. Patent 2,631,984, by reacting a rubbery isoolefin-polyolefin hydrocarbon interpolymer with a brominating agent, preferably in solution. Since the reaction which occurs involves an addition of bromine to olefinic double bonds, the isoolefin-polyolefin interpolymer used must and will, of course, contain olefinic unsaturation, but its nature may otherwise be varied widely.

Preferred isoolefin-polyolefin interpolymers for use in preparing brominated derivatives are the solid, plastic rubbery interpolymers (in other words, high molecular weight polymers) of a major proportion, more desirably from 70 to 99% by weight, of an isoolefin generally containing from 4 to 8 carbon atoms and a terminal methylene group, such as, most desirably, isobutylene or, alternatively, 3-methyl butene-1, 4-methyl pentene-1, 2-ethyl butene-1, 4-ethyl pentene-1, 4-ethyl hexene-1 or the like, or a mixture of such isoolefins, with a minor proportion, desirably from 1 to 30% by weight of a polyolefinic hydrocarbon generally containing from 4 to 18 carbon atoms, or two, three or more such polyolefinic hydrocarbons, including the following:

(1) acyclic diolefins or open-chain, aliphatic conjugated dienes such as butadiene-1,3 isoprene, 2,4-dimethyl butadiene-1,3, piperylene, 3-methyl pentadiene-1,3, hexadiene-2,4, 2-neopentyl-butadiene-1,3 and the like;

(2) acyclic non-conjugated diolefins such as dimethallyl and its homologs containing 2 to 6 carbon atoms interposed between two isopropenyl radicals, 2 - methyl hexadiene-1,5, 2-methyl pentadiene - 1,4, 2 - methyl heptadiene - 1,6, 2-methyl heptadiene-1,4 and other tertiary non-conjugated diolefins having one double bond in the terminal position attached to a tertiary carbon atom;

(3) alicyclic diolefins, both conjugated and non-conjugated, such as cyclopentadiene, cyclohexadiene, 1-vinyl cyclohexene-3, 1-vinyl cyclohexene-1, 1-vinyl cyclopentene-1, 1-vinyl cyclobutene-2, dicyclopentadiene, and the like as well as monocyclic diolefinic terpenes such as dipentene, terpinenes, terpinolene, phellandrenes, sylvestrene and the like;

(4) acyclic triolefins such as 2,6-dimethyl-4-methylene-heptadiene-2,5, 2-methyl hexatriene-1,3,5 and other conjugated triolefins, as well as myrcene, ocimene, allo-ocimene and the like;

(5) alicyclic triolefins such as fulvene, 6,6-dimethyl fulvene, 6,6-methyl-ethyl fulvene, 6-ethyl fulvene, 6,6-diphenyl fulvene, 6-phenyl fulvene and other fulvenes of the formula

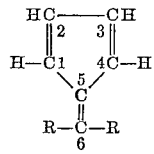

where R is hydrogen, alkyl, cycloalkyl, or aryl; as well as other alicyclic triolefins such as 1,3,3-trimethyl-6-vinyl cyclohexadiene-2,4, cycloheptatriene, etc.;

(6) higher polyolefins such as 6,6-vinyl methyl fulvene (a tetraolefin) and 6,6-diisopropenyl fulvene (a pentaolefin), and (7) aromatic hydrocarbons containing a plurality of olefinically unsaturated non-aromatic hydrocarbon groups such as vinyl groups, representative of which are divinyl benzene and similar polyvinyl or polyisopropenyl aromatic hydrocarbons.

Such solid, plastic, rubbery interpolymers, for use in preparing brominated derivatives, are themselves generally prepared by low temperature polymerization (from 0° to −165° C.) utilizing an appropriate catalyst, generally an active metal halide or Friedel-Crafts type catalyst such as aluminum chloride or boron trifluoride, dissolved in a low freezing solvent such as methyl or ethyl chloride, and, when so prepared, generally possess an average molecular weight above 15,000 and often as high as 30,000 to 120,000 or higher, iodine numbers in the range 0.5 to 50, and are reactive with sulfur to yield elastic products. Most important of these are the solid plastic interpolymers of isobutylene with small amounts of isoprene or butadiene, of the type shown as "Butyl" or "GRI" rubber.

However, it is to be understood that the silicate stabilizers are equally effective when applied to brominated interpolymers made from isoolefin polyolefin interpolymers other than the preferred materials set forth above. Any of the known isoolefin-polyolefin hydrocarbon interpolymers may be converted to useful brominated derivatives and utilized in the method of this invention. For example, resinous interpolymers of low molecular weight and/or not readily vulcanizable with sulfur are readily converted to brominated derivatives having enhanced adhesive properties and the ability to be utilized advantageously in the compounding of rubbery materials. Similarly, isoolefin-polyolefin hydrocarbon interpolymers containing other interpolymerized monomers such as styrene, chlorostyrenes, acrylyl chloride, methallyl chloride, and other monoolefinic monomers also are advantageously utilized to prepare brominated derivatives. To illustrate, a brominated interpolymer of 50% isobutylene, 30% styrene and 20% isoprene is superior to the corresponding unbrominated interpolymer as an adhesive and in the compounding of rubbery materials.

In preparing the brominated derivatives for use in this invention, any brominating agent may be utilized such as molecular bromine itself or the compounds of bromine which liberate molecular bromine among which are sodium hypobromite, magnesium bromide hexahydrate, N-bromo-succinimide, alpha - bromoacetoacetanilide, beta-bromoethyl phthalimide, N-bromoacetamide, tribromo phenol bromide, bromo-beta-naphthol, pyridinium bromide perbromide, etc.

In accordance with the disclosure of our copending application Serial No. 156,724 the bromination may be carried out in many ways. One method consists in preparing a solution, dispersion or cement of the interpolymer in an appropriate normally liquid organic solvent or diluent such as a hydrocarbon or halogenated derivative thereof (examples of which are toluene, chlorobenzene, hexane, heptane, trichloroethane, carbon tetrachloride, etc.) and adding the brominating agent either as such or in solution, for example, in carbon tetrachloride, to the resulting interpolymer solution, dispersion or cement thereby to form the brominated interpolymer in solution or dispersion in the solvent or diluent. The resulting solution or dispersion may be utilized as such, as, for example, when the brominated derivative is employed as an adhesive, or it may be admixed with a non-solvent for the brominated derivative (such as alcohol or water) to precipitate the brominated derivative which is then recovered in the solid, finely-divided or crumb-like form, in either of which cases it is preferred that the silicate stabilizer be incorporated in the solution or dispersion of brominated interpolymer before utilizing the latter as an adhesive or before precipitation thereof.

A more preferred method, particularly advantageous to those having "Butyl" type polymerization equipment consists in utilizing as the solvent or diluent for the bromination a saturated hydrocarbon or halogenated derivative thereof which boils below room temperature such as methyl or ethyl chloride or butane, and carrying out the bromination at a temperature and pressure such that the solvent is maintained in the liquid state. This greatly simplifies recovery of the solvent or diluent since the resulting solution of brominated interpolymer can be run into water above the boiling point of the solvent or diluent so that the latter is flashed off and condensed while the brominated interpolymer is precipitated or coagulated in a conveniently handled crumb-like form. The ethyl chloride solution of interpolymer utilized in this variation of the process is conveniently prepared by dissolving the solid interpolymer in the solvent. Preferably, the ethyl chloride solution resulting from the "Butyl" type polymerization may be utilized directly with addition thereto of a soluton of bromine in ethyl chloride or carbon tetrachloride followed by quenching with an alkaline material which results both in neutralization of excess bromine and inactivation of the Friedel-Crafts catalyst.

Another method of preparing brominated interpolymers consists in passing bromine vapors over a finely-divided or shredded solid interpolymer. Still another method, also applicable to solid interpolymers, resides in adding a solid brominating agent to the interpolymer on a mixing mill, followed by heating the mixture to a temperature above that at which the brominating agent decomposes to liberate molecular bromine.

Regardless of the particular method employed for effecting the bromination, it has been found that the bromination reaction occurs quite rapidly and essentially involves the addition of bromine to the olefinic double bonds of the interpolymer. Consequently, the resulting bromine-containing interpolymers possess in their structure units of the formula

These units not found in known isoolefin-polyolefin hydrocarbon interpolymers, may well be responsible, at least in part, for the unique properties of the bromine-containing interpolymers. It should be pointed out, however, that some substitution may and probably does occur, along with addition of bromine to olefinic double bonds, during the bromination reaction, and that, therefore, it is not essential that all combined bromine be present in the

structure.

However, it has been found that if the bromination is carried out at temperatures at or above room temperature or if the contact between excess bromine and the interpolymer is prolonged, a marked degradation of the physical properties of the product may occur. This degradation manifests itself as a pronounced softening or reduction in apparent molecular weight. It is not fully understood but it is believed that molecular bromine may be an active depolymerization agent or that substituted bromine as distinguished from bromine added to olefinic bonds, may favor depolymerization. Regardless of the cause, most useful brominated interpolymers are produced when substitution and exposure to molecular bromine is kept at a minimum. Such a reaction is efficiently carried out in a pipe line or other elongated positive through-put type of reactor in a continuous manner. Since the addition reaction appears to be almost instantaneous, the prompt addition of an alkaline neutralizer such as potassium hydroxide or sodium carbonate shortly after initial mixing of the rubber and bromine solutions also favors production of most useful brominated interpolymers.

The amount of bromine which combines with the interpolymer during bromination depends upon the brominating agent being used, the method of bromination and the concentration of brominating agent. When other factors are constant under the preferred conditions of low temperature and short contact time there appears to be an approximate straight line relationship between the original concentration of available bromine and the amount of bromine combined with the interpolymer. In general, the amount of combined bromine is about ⅕ to ⅖ that of the original concentration of bromine while under accurately controlled conditions it is usually about ¼. This is quite advantageous since the bromine content of the product can be controlled rather closely simply by regulating the original concentration of the brominating agent.

The brominated interpolymers resulting from the bromination reaction may contain from as little as 0.5% by weight or to 4, 8, 10 or even 15% by weight, or even as much as 50% by weight of combined bromine depending on the degree of unsaturation of the parent interpolymer, which in turn depends upon the proportion of combined polyolefin in the interpolymer utilized. Preferably, for any given derivative, the percentage of combined bromine is less than that which would theoretically be present if all the olefinic (>C=C< units) double bonds were completely brominated to give

units, and preferably, for high molecular weight rubbery isoolefin-polyolefin interpolymers having an iodine number less than 50, that is of the nature of Butyl rubber, the percentage of combined bromine is from 20 to 80% of the possible theoretical amount. Still more preferably, the percentage of combined bromine in such interpolymers is in the range of 1 to 8% by weight, and for adhesive applications is in the range of 1.5 to 4% by weight. Most useful brominated interpolymers are those derived from Butyl rubber in which the percentage of combined bromine is 40 to 60% of theoretical or 2.5 to 4.5% by weight or, more particularly, about 3% by weight.

From the foregoing, it is apparent that the preferred brominated interpolymer derivatives for use in this invention are not completely saturated but that they are less unsaturated than the parent unbrominated interpolymers. Their molecular weights are not precisely known but they are of the same order as the parent interpolymer. Even though some depolymerization may occur during bromination their "apparent" molecular weights are generally about the same or slightly higher because of the presence of the relatively heavy bromine atoms.

Bromination of isoolefin-polyolefin interpolymers so as to produce

units is not the only method of arriving at interpolymers containing such units, but is at present preferred. Another method consists in interpolymerizing an isoolefinic monomer with a polyolefinic monomer at least one of which monomers is brominated so as to contain the

structure. For example, the interpolymerization of isobutylene with 2,3-dibromo-butadiene-1,3 (which has the

unit in its structure of

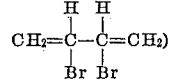

results in the production of an interpolymer containing such units; this interpolymer, however, is more unsaturated for a given bromine content than are the bromine-containing interpolymers produced by the bromination of isoolefin-diolefin interpolymers.

As mentioned above, the bromine-containing isoolefin-polyolefin interpolymers are possessed of unique properties in and of themselves and when stabilized according to this invention, are exceedingly useful, especially in adhesives, in the manufacture of inner tubes, the tire-curing bags, etc. (where great heat stability, resistance to air diffusion, oxygen, steam, water, ozone etc. are required) and for various other purposes of particular importance in manufacture of tires and a multitude of other rubber products, in which the unbrominated isoolefin-polyolefin interpolymers are not entirely satisfactory. For example, the stabilized brominated interpolymers of this invention, without further addition of compounding ingredients, are excellent adhesives to bond rubbery materials to each other or to metal and other structural materials, being especially useful in bonding the unbrominated isoolefin-polyolefin interpolymers to each other, to natural rubber and to diene synthetic rubbers. The stabilized bromine-containing interpolymers are compatible in all proportions with the natural and diene synthetic rubbers forming vulcanizable admixtures therewith which possess the desirable properties of remarkably increased ozone resistance, improved resistance to flexing, and increased resistance to air diffusion. In any of these uses they may be compounded with any of the conventional ingredients used in compounding the unbrominated rubbery isoolefin-polyolefin interpolymers or other rubbery materials, and they may be vulcanized by the same general methods. Their vulcanization proceeds much more rapidly than that of the unbrominated materials, despite their generally lower degree of unsaturation, and they may be vulcanized in the absence of sulfur with agents, such as the polyvalent metal oxides particularly zinc oxide, which are ineffective in vulcanizing the parent unbrominated interpolymer.

The preparation of representative bromine-containing interpolymers and their stabilization according to this invention are more fully set forth in the following examples which are illustrative only since numerous variations and modifications therein will be apparent to those skilled in the art. In the examples, all parts, unless otherwise indicated, are by weight.

EXAMPLE 1

91 parts of a solid plastic rubbery copolymer of about 97% isobutylene and 3% isoprene known as "Butyl" or "GRI–15" is dissolved in sufficient n-heptane to form a fluid solution. 9 parts of liquid bromine as a 10% solution in carbon tetrachloride are then added to the heptane solution and the resulting mixture stirred for about 1 hour in the dark. An excess of sodium carbonate as a 10 to 30% solution in water is then added to neutralize the unreacted bromine. After a short period of agitation the neutralized brominated cement is blended with a quantity of methanol to precipitate the brominated copolymer, the latter then being filtered, washed and dried. The brominated copolymer thus obtained contains 2.25% of combined bromine and is slightly softer than the parent copolymer.

The copolymer when vulcanized by sulfur either alone or in blends with natural rubber or with butadiene styrene or butadiene-acrylonitrile synthetic rubber forms strong, highly useful compositions. However, when the raw brominated copolymer is allowed to stand in air at 70° C. it becomes tough, in fact in 3 days it becomes so tough as to be somewhat difficult to process. This toughening, without substantial change in bromine content, is illustrated by the following data for the raw brominated copolymer, after aging, as to its bromine content and Mooney viscosity at 1 minute, 10 minutes, and 20 minutes using the 1.2 inch rotor at 250° F.:

| Days Aged at 70° C. | Bromine Content, Percent | Mooney Viscosity | | |
|---|---|---|---|---|
| | | M1′ | M10′ | M20′ |
| 0 | 2.25 | 63 | 78 | 81 |
| 1 | 2.18 | 85 | 104 | 104 |
| 2 | 2.04 | 110 | 120 | 112 |
| 3 | 2.23 | 128 | 115 | 110 |

The physical properties of vulcanizates of the brominated copolymer also deteriorate during aging at 70° C., the tensile strength of a sulfur vulcanizate of an unaged sample of brominated copolymer in a 60/40 blend with natural rubber being 1775 lbs./sq. in. while that of a similar blend containing a brominated copolymer aged 3 days at 70° C. is considerably less.

The unstabilized brominated copolymer also increases in Mooney viscosity during a Mooney viscosity determination. After an initial reading of 21 a stock containing such copolymer evidences a Mooney viscosity of 37 after 1 minute and 47 after 15 minutes at 250° F. When aged for seven days at 70° C. the same stock is of a dark color and evidences an initial Mooney reading of 51, a 1 minute Mooney of 76 and a 15 minute Mooney of 72.5. By contrast when only 1.25% on the brominated copolymer of a finely-divided precipitated calcium silicate known as "Silene EF" is milled into the brominated copolymer the resulting composition is light in color, has a 1 minute Mooney of 40 and a 15 minute Mooney of 22. After aging for seven days at 70° C. the stock is a very light brown in color. Thus only 1.25% of calcium silicate is sufficient to stabilize the brominated copolymer during processing and to prevent blackening of the stock. When 2.5% of the same calcium silicate is incorporated the initial Mooney reading is 19, the 1 minute Mooney is 38 and the 15 minute Mooney is only 20.5. After aging 7 days at 70° C. the initial reading on this same composition is 39, the 1 minute Mooney is 42 and the 15 minute Mooney is only 44. Thus the use of 2.5% calcium silicate stabilizes the brominated copolymer not only during processing but also during an accelerated 7 day heat aging.

The incorporation of calcium silicate into the brominated isoolefin-polyolefin interpolymer not only stabilizes the latter against heat-induced changes in plasticity and color during processing and storage but also has a very beneficial effect on the physical properties of vulcanized compositions prepared therefrom. Separate samples of the unstabilized brominated copolymer described above, both aged and unaged, and an aged sample of the stabilized composition containing 2.5% calcium silicate are compounded with natural rubber and the usual sulfur vulcanization ingredients to form a white side wall tire compound as follows:

| | Parts/wt. |
|---|---|
| Brominated copolymer | 60.0 |
| Natural rubber | 40.0 |
| Zinc oxide | 87.0 |
| Ultramarine Blue | 0.2 |
| Titanium dioxide | 14.0 |
| Stearic acid | 1.5 |
| Mercaptobenzothiazole | 0.75 |
| Di-orthotolyl guanidine | 0.25 |
| Sulfur | 2.50 |

When portions of each composition are vulcanized at 280° F. for varying periods of time the physical properties of the vulcanizates are as shown in the following Table I:

*Table I*

| Cure Min./280° F. | Unaged—Unstabilized | | | Aged—7 days @ 70° C. Unstabilized | | | Aged—7 days @ 70° C. 2.5% CaSiO₃ | | |
|---|---|---|---|---|---|---|---|---|---|
| | T | E | M | T | E | M | T | E | M |
| 15 | 1,750 | 775 | 400 | 1,100 | 620 | 500 | 1,650 | 685 | 600 |
| 30 | 1,600 | 700 | 450 | 1,200 | 590 | 600 | 1,650 | 685 | 600 |
| 45 | 1,750 | 705 | 450 | 1,200 | 595 | 600 | 1,500 | 630 | 600 |
| 75 | 1,600 | 680 | 500 | 1,300 | 595 | 500 | 1,250 | 590 | 600 |

Inspection of the data in Table I clearly shows that without stabilizer aging for 7 days in air at 70° C. results in a lowering of the physical properties of the white side wall tire compound while with only 2.5% by weight of calcium silicate the physical properties are substantially unaffected. The composition containing calcium silicate also seems to have a faster cure rate than the aged unstabilized composition since optimum physical properties of the former are reached in 15 minutes while the latter shows signs of continued cure at 45 to 75 minutes. The aged calcium silicate containing composition, moreover, was very white in color while the aged-unstabilized vulcanizate was a creamy buff. Similar results are noted with amounts of calcium silicate ranging from 1 to 10% or more and with equivalent amounts of barium silicate.

EXAMPLE 2

The isobutylene isoprene copolymer utilized in the bromination step of Example 1 is dissolved in liquid ethyl chloride to form a 20% solution containing 100 parts of copolymer. A solution containing 5 to 16 parts of bromine dissolved in ethyl chloride is added to the copolymer solution at 0° C. in a closed vessel and the resulting mixture stirred for five minutes at which point an excess of alcoholic potassium hydroxide is added to neutralize the unreacted bromine. After stirring for several minutes to allow neutralization to be completed an aqueous slurry of finely-divided calcium silicate (2.5% based on the weight of brominated copolymer) in water is added and the mixture stirred rapidly. Following further stirring to form a substantially homogeneous mixture the contents of the reaction vessel are discharged in a fine stream or spray into a closed coagulating tank fitted with a condenser and containing hot water (60-70° C.) and a colloidal dispersion of calcium silicate, whereupon the ethyl chloride is flashed off and condensed and the brominated copolymer is obtained as a fine crumb-like coagulum containing intimately dispersed calcium silicate. The presence of calcium silicate in the copolymer solution and in the coagulation bath assists in obtaining a fine, small sized and non-sticky crumb. The coagulum is finally separated by filtering and is washed once or twice with clear water and dried.

The calcium silicate containing brominated isobutylene-isoprene copolymer thus obtained contains from 1.5 to 6.0% of combined bromine (depending on the original amount of bromine used) and is a plastic, easily worked rubbery material having approximately the same Mooney viscosity as the parent copolymer. Compounded with sulfur and accelerators in the natural rubber white side wall tire compound of Example 1 and then vulcanized, the copolymer derivative containing 2.5 to 3.0% by weight of calcium silicate exhibits 2500 lbs./sq. in. tensile strength and is white in color. After aging the copolymer derivative in air for as much as 28 days at 70° C. the color or physical properties of its vulcanizates are substantially unchanged. When exposed to 27.9 p. p. h. m. of ozone at 280° F. while under 20% stretch the vulcanizate requires 167 hours to show the first crack while a similar vulcanizate prepared without calcium silicate cracks in less than 100 hours.

EXAMPLE 3

A brominated isobutylene-isoprene copolymer of the type shown in Example 2 containing 3% combined bromine is compounded in a white side wall tire compound containing 40 parts of natural rubber (recipe of Example 1) but in which a portion of the zinc oxide is omitted and an equivalent volume of calcium silicate and precipitated silica substituted therefor (15 and 10 volumes respectively). The resulting compound produces a vulcanizate having greatly superior tensile strength and 400% modulus when measured at 212° F. The vulcanizate possesses superior hot flexing properties and greatly superior ozone resistance. The flexing properties and ozone resistance of the stabilized compositions are particularly outstanding. The compositions containing calcium silicate withstand approximately 1,000,000 flexures in the Demattia apparatus while those not containing calcium silicate fail at about 50,000 to 100,000 flexures. Similarly when exposed under 20% stretch to 25 p. p. h. m. of ozone at 120° F. vulcanized compositions containing 1.5% and 4.5% calcium silicate do not show the first crack until at least 100 hours exposure while the unstabilized vulcanizate cracks in 45 hours.

Similar results are obtained, using from 1 to 10% or more of calcium, barium, or strontium, silicates, in blends of the above high molecular weight brominated copolymers with butadiene styrene copolymer rubbers and with butadiene acrylonitrile copolymer rubbers. Also, reclaimed or refined "butyl" rubber after bromination is also efficiently stabilized by these metal silicates and is highly useful in adhesive applications, particularly in adhering ordinary butyl rubber to natural and synthetic rubbers.

EXAMPLE 4

The brominated interpolymer of Example 2 containing 3% combined or polymer-bound bromine and 2% of a polymeric plasticizer such as the polyester oil known as "Paraplex G-60" is compounded with 4.5, 15.0, 25.0 and 31.0 parts per 100 of polymer of the calcium silicate pigment known as "Silene EF" along with the other ingredients of the white side wall tire composition of Example 1. The vulcanizate resulting after vulcanization for 150 minutes at 280° F. along with that of a control composition containing no calcium silicate are tested for their tensile strength at 212° F. The control composition (which has a room temperature tensile of 1650 lbs./sq. in. and an elongation of 705%) has at 212° F. a tensile of only 233 lbs./sq. in. and an elongation of only 415% while the compositions containing calcium silicate (which have room temperature tensile and elongation of 1600 to 1700 lbs./sq. in. and 600 to 700%, respectively) show progressive improvement in hot tensile with increasing calcium silicate until the vulcanizate containing 31 parts has a 212° F. tensile of 640 lbs./sq. in. and a 212° F. elongation of 535%.

EXAMPLE 5

The previous examples have shown the effect of the silicate stabilizers on 60/40 blends of the brominated isoolefin-polyolefin polymers with natural rubber. Blends with natural rubber ranging from 5 to 95% of the bromine-containing polymer and 5 to 95% of natural rubber or natural rubber reclaim also are so stabilized. Similar stabilization effects are noted also in vulcanizates prepared from the bromine-containing polymers alone and in blends with other natural and synthetic rubbers and reclaimed forms of such rubbers. Specifically, blends ranging from 10 to 95% by weight of the bromine-containing isoolefin-polyolefin polymer and 5 to 95% of butadiene acrylonitrile copolymer rubbers are similarly stabilized against discoloration in the raw polymer state and in the form of sulfur-vulcanizates are stabilized during heat-aging and are possessed of better hot-flexing and hot tensile properties. Also similar blends with butadiene styrene copolymer rubbers, polychloroprene rubbers, unbrominated "Butyl" rubbers, thiokol-type rubbers and other are also efficiently stabilized by calcium silicate.

EXAMPLE 6

Other brominated isoolefin-polyolefin hydrocarbon interpolymers show a similar response to the incorporation of the metal silicates of this invention. For example, a copolymer of 90 to 97% isobutylene, 1 to 3% isoprene and 2 to 5% 6,6-dimethyl fulvene prepared by polymerization at about −100° C. in ethyl chloride using aluminum chloride catalyst and having a molecular weight of from 630,000 to 970,000 and an iodine value (by the Wijis method) of 2.5 to 10 is easily converted to brominated derivatives containing from 2 to 7% or more bromine. From 1 to 10% or more of calcium silicate stabilizes this type of brominated copolymer in the same manner as is shown in the foregoing examples. Still other isoolefin-polyolefin hydrocarbon interpolymers easily converted to brominated derivatives and stabilized by the metal silicates of this invention are interpolymers of isobutylene or another isoolefin with isoprene and/or 1 to 5% of cyclopentadiene, dicyclopentadiene, 1-vinyl cyclohexene-3, myrcene and others.

From the foregoing description of the invention, it will be seen that the stabilized bromine-containing interpolymer compositions constitute a new, greatly improved and widely useful class of materials. It is apparent, therefore, that various embodiments of the invention, in addition to those specifically disclosed, may be provided without departing from the spirit and scope of the invention as defined in the appended claims.

We claim:

1. The method of stabilizing an interpolymer of an isoolefinic hydrocarbon containing 4 to 8 carbon atoms and a terminal methylene group and a polyolefinic hydrocarbon containing at least 0.5% by weight of combined bromine of addition which comprises incorporating therein a silicate of a metal occurring in group II of the periodic table.

2. A rubbery composition comprising a brominated rubbery interpolymer of an isoolefinic hydrocarbon containing 4 to 8 carbon atoms and a terminal methylene group and a polyolefinic hydrocarbon, said brominated interpolymer containing at least 0.5% by weight of combined bromine and, as a stabilizer therefor, a silicate of a metal occurring in group II of the periodic table.

3. A rubbery composition comprising a partially-brominated derivative of a rubbery interpolymer of a major proportion of isobutylene and a minor proportion of a butadiene-1,3 hydrocarbon, said brominated derivative containing combined bromine ranging from 20 to 80% of that theoretically required to react with the double bonds of the original interpolymer and, as a stabilizer therefor, calcium silicate.

4. A rubbery composition comprising a partially-brominated derivative of a rubbery interpolymer of from 70 to 90% by weight of isobutylene and from 1 to 30% by weight of isoprene, said brominated derivative containing combined bromine ranging from 20 to 80% of that theoretically required to react with the double bonds of the original interpolymer and, as a stabilizer therefor, finely-divided calcium silicate.

5. A rubbery composition comprising a partially-brominated derivative of a rubbery copolymer of isobutylene and isoprene containing from 2 to 4% by weight combined bromine and, as a stabilizer therefor, finely-divided calcium silicate.

References Cited in the file of this patent

UNITED STATES PATENTS

| Number | Name | Date |
|---|---|---|
| 2,179,973 | Alexander | Nov. 14, 1939 |